(12) United States Patent
Dominguez Cuevas et al.

(10) Patent No.: US 10,471,900 B1
(45) Date of Patent: Nov. 12, 2019

(54) ADJUSTABLE CONTAINER HOLDER FOR A VEHICLE DOOR MAP POCKET

(71) Applicant: GM Global Technology Operations LLC, Detroit, MI (US)

(72) Inventors: Jesus Edgar Dominguez Cuevas, Jiutepec (MX); Alejandro Barrera Torres, Metepec (MX); Leon Alfonso Alvarez Solleiro, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/126,321

(22) Filed: Sep. 10, 2018

(51) Int. Cl.
*B60R 7/04* (2006.01)

(52) U.S. Cl.
CPC .................... *B60R 7/046* (2013.01)

(58) Field of Classification Search
CPC ....................................................... B60R 7/046
USPC ............................................. 296/37.13, 37.8
See application file for complete search history.

(56) References Cited

U.S. PATENT DOCUMENTS

| | | | | |
|---|---|---|---|---|
| 8,562,065 B2 * | 10/2013 | Langenbacher | ....... | B60N 3/101 296/146.7 |
| 2007/0145760 A1 * | 6/2007 | Gresham | ................. | B60R 7/046 296/37.13 |
| 2019/0092245 A1 * | 3/2019 | Makino | ................... | B60R 7/046 |

* cited by examiner

*Primary Examiner* — Joseph D. Pape

(57) ABSTRACT

A door panel for a passenger door of a vehicle is disclosed. The door panel includes a map pocket having a container holder. The door panel includes a main body defining an inner surface facing a passenger compartment of the vehicle, a retention wall, and a retention member. The main body include a lower end portion and a shelf located at the lower end portion of the main body. The shelf extends from the inner surface of the main body and towards the passenger compartment of the vehicle to define a portion of the map pocket. The retention wall extends from the shelf of the main body. The retention wall and a portion of the inner surface of the main body define the container holder. The retention member is configured to elastically deform when a container is placed within the container holder.

20 Claims, 7 Drawing Sheets

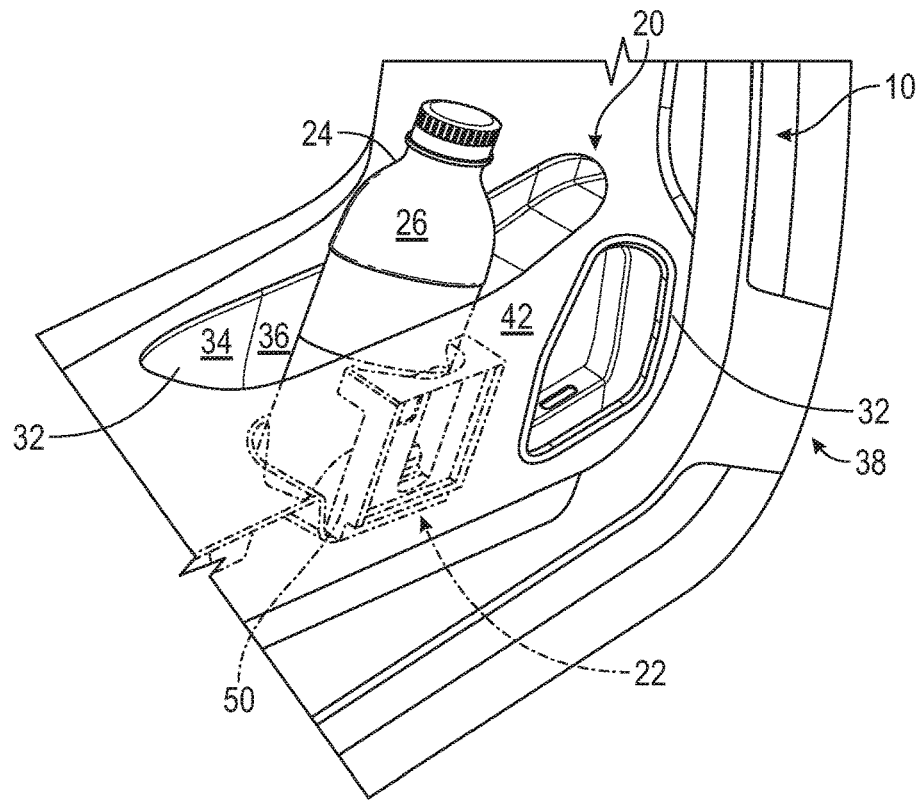
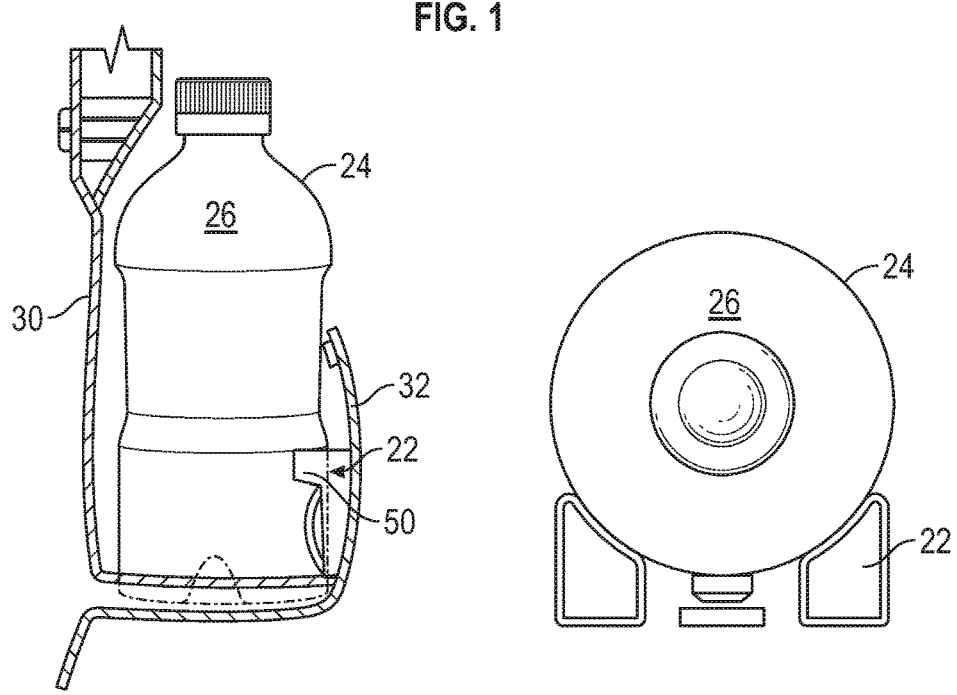
FIG. 1
FIG. 2A   FIG. 2B

ADJUSTABLE CONTAINER HOLDER FOR A VEHICLE DOOR MAP POCKET

INTRODUCTION

The present disclosure relates to a door for a vehicle, and more particularly to a door for a vehicle having a map pocket, where the map pocket includes a container holder having an adjustable retention member for securing a container.

A map pocket is a storage compartment located within a driver or passenger door of an automobile. More specifically, a map pocket is typically located in the lower portion of a door trim assembly of an automobile door. In the past, map pockets were commonly used to store printed references that provided navigational assistance such as, for example, maps and atlases. However, nowadays passengers tend rely on more on electronic devices instead of printed maps for navigational assistance. As a result, items other than maps are commonly stored in the map pocket. For example, passengers may store beverage containers such as bottles, travel mugs, and disposable cups within the map pocket of an automobile. Alternatively, in another approach, the map pocket may be used to store accessories. Some examples of accessories that are commonly stored in the map pocket include umbrellas.

Map pockets typically include an opening shaped to only secure cups and bottles of a particular size or circumference without excessive movement. In other words, map pockets are not able to accommodate beverage containers of different sizes. Therefore, relatively smaller beverage containers placed within the map pocket may fall over and spill liquid or create rattling during operation of the automobile. Also, smaller beverage containers may fall over and spill liquid or rattle when the passenger door is opened or closed. These types of issues may lead to customer dissatisfaction.

Thus, while current map pockets achieve their intended purpose, there is a need for a new and improved system and method for securing beverage containers within a map pocket.

SUMMARY

According to several aspects, a door panel for a passenger door of a vehicle is disclosed, where the door panel includes a map pocket having a container holder. The door panel includes a main body defining an inner surface facing a passenger compartment of the vehicle, a lower end portion, and a shelf located at the lower end portion of the main body. The shelf extends from the inner surface of the main body and towards the passenger compartment of the vehicle to define a portion of the map pocket. The door panel also includes a retention wall extending from the shelf of the main body, where the retention wall and a portion of the inner surface of the main body define the container holder. The door panel also includes a retention member defining an elongated body having two end portions and a bowed section located between the two end portions. The two end portions of the retention member are connected to the retention wall and the bowed section flexes towards the inner surface of the main body. The retention member is configured to elastically deform when a container is placed within the container holder.

In another aspect, the door panel further includes a living hinge connecting the retention wall to the main body.

In yet another aspect, the living hinge extends along a lowermost edge of the shelf of the door panel.

In still another aspect, the retention member defines a series of undulations extending in a direction substantially perpendicular with respect to the bowed section of the retention member.

In another aspect, the retention member includes an area of reduced wall thickness located between two respective undulations.

In yet another aspect, an elastic limit of the retention member is based on a height and a width of each undulation.

In still another aspect, the retention member is constructed of either polypropylene or thermoplastic olefin (TPO).

In another aspect, the retention wall defines an innermost surface that opposes the inner surface of the main body of the door panel and an outermost surface that faces the passenger compartment of the vehicle.

In yet another aspect, the door panel further comprises a door trim panel mounted to the door panel, where an inside surface of the door trim panel defines a remaining portion of the map pocket.

In still another aspect, an outermost surface of the retention wall defines a plurality of snap-fit features configured to engage with corresponding snap-fit features located along an inside surface of the door trim panel.

In another aspect, the retention wall defines a surface facing the inner surface of the door panel, and wherein a molding extends outward from the surface of the retention wall in a direction towards the inner surface of the door panel.

In yet another aspect, the molding includes a retention surface shaped to correspond with an outermost profile of the container.

In still another aspect, the shelf defines a support surface, and wherein the container rests upon the support surface.

In another aspect, the door panel further includes a pair of support walls defined by the vertical support surface. The pair of support walls are aligned with a fore direction and an aft direction of the vehicle.

In yet another aspect, one of the pair of support walls is located on one side of the container holder corresponding to the fore direction of the vehicle and a remaining support wall is located on an opposing side of the container holder corresponding to the aft direction of the vehicle.

In another aspect, passenger door of a vehicle is disclosed. The passenger door includes a door panel including a map pocket having a container holder and a main body. The main body defines an inner surface facing a passenger compartment of the vehicle, a lower end portion, and a shelf located at the lower end portion of the main body. The shelf extends from the inner surface of the main body and towards the passenger compartment of the vehicle to define a portion of the map pocket. The passenger door also includes a door trim panel mounted to the door panel. The door trim panel defines a remaining portion of the map pocket. The passenger door also includes a retention wall extending from the shelf of the main body. The retention wall and a portion of the inner surface of the main body define the container holder. The passenger door includes a living hinge connecting the retention wall to the door panel. Finally, the passenger door includes a retention member defining an elongated body having two end portions and a bowed section located between the two end portions. The two end portions of the retention member are connected to the retention wall and the bowed section flexes towards the inner surface of the main body. The retention member is configured to elastically deform when a container is placed within the container holder.

In another aspect, the retention member defines a series of undulations extending in a direction substantially perpendicular with respect to the bowed section of the retention member.

In yet another aspect, the retention member includes an area of reduced wall thickness located between two respective undulations.

In still another aspect, an elastic limit of the retention member is based on a height and a width of each undulation.

In another aspect, the retention wall defines a surface facing the inner surface of the door panel. A molding extends outward from the surface of the retention wall in a direction towards the inner surface of the door panel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is an illustration of a portion of a passenger door for a vehicle, where the passenger door includes a map pocket, a container holder, and a container that is secured by the container holder according to an exemplary embodiment;

FIG. 2A is a cross-sectional side view of the container and the container holder shown in FIG. 1 according to an exemplary embodiment;

FIG. 2B is a top view of the container and the container holder shown in FIG. 1 according to an exemplary embodiment;

DETAILED DESCRIPTION

Figure 3A:
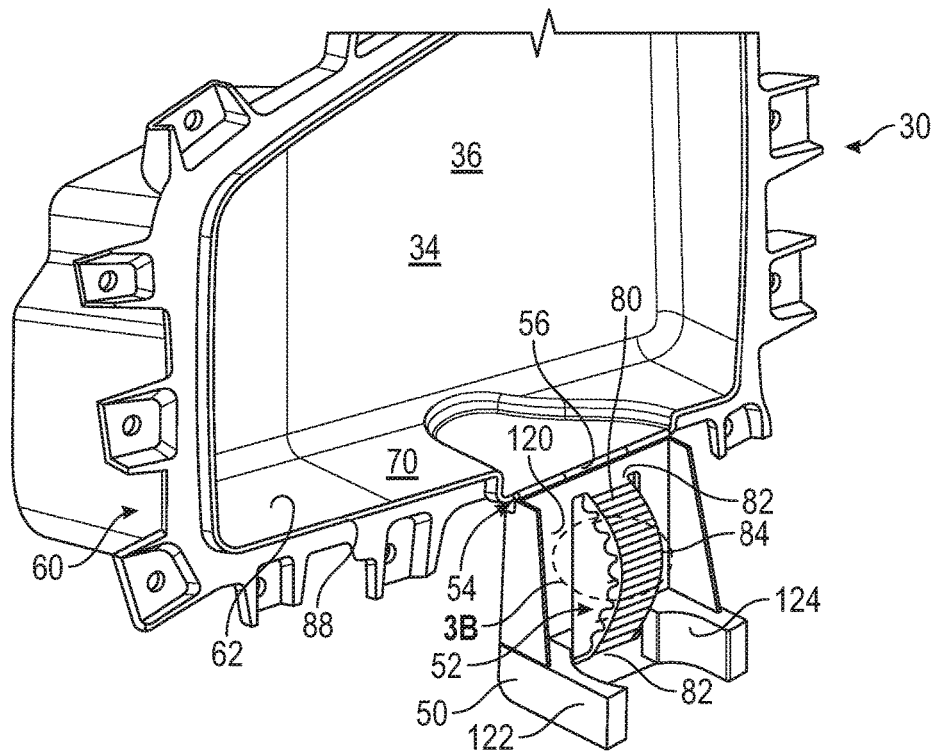
FIG. 3A is an illustration of a door panel for the door, where a door trim panel is removed to show the container holder according to an exemplary embodiment.

The following description is merely exemplary in nature and is not intended to limit the present disclosure, application, or uses.

FIG. 1 is an illustration of a portion of a passenger door 10 for a vehicle (not illustrated). In an embodiment, the vehicle is a motor vehicle such as a passenger car, truck, sport utility vehicle, van, or motor home. The passenger door 10 of the vehicle may represent a driver side door, a front passenger side door, or a rear passenger door. The passenger door 10 includes a map pocket 20 and a container holder 22. The container holder 22 is located within the map pocket 20 and is configured to hold a container 24 securely in place without substantial movement. Furthermore, as explained below, the container holder 22 is adjustable to accommodate containers 24 of different sizes.

In the exemplary embodiment as shown in FIG. 1, the container 24 is a beverage container. Specifically, the container 24 is shown as a bottle containing a liquid such as, for example, water, a carbonated beverage, coffee, or fruit juice. However, it is to be appreciated that the container is not limited to a bottle for containing beverages. Instead, the container 24 may be any vessel such as, but not limited to, travel mugs or disposable cups. Furthermore, the container 24 is not limited to carrying beverages and liquids. Instead, in an embodiment the container 24 may contain solid objects such as, for example, food. In one embodiment, the container 24 may include a substantially cylindrical outermost profile 26. However, it is to be appreciated that the container holder 22 is not limited to securing containers having a cylindrical outermost profile.

Figure 4:
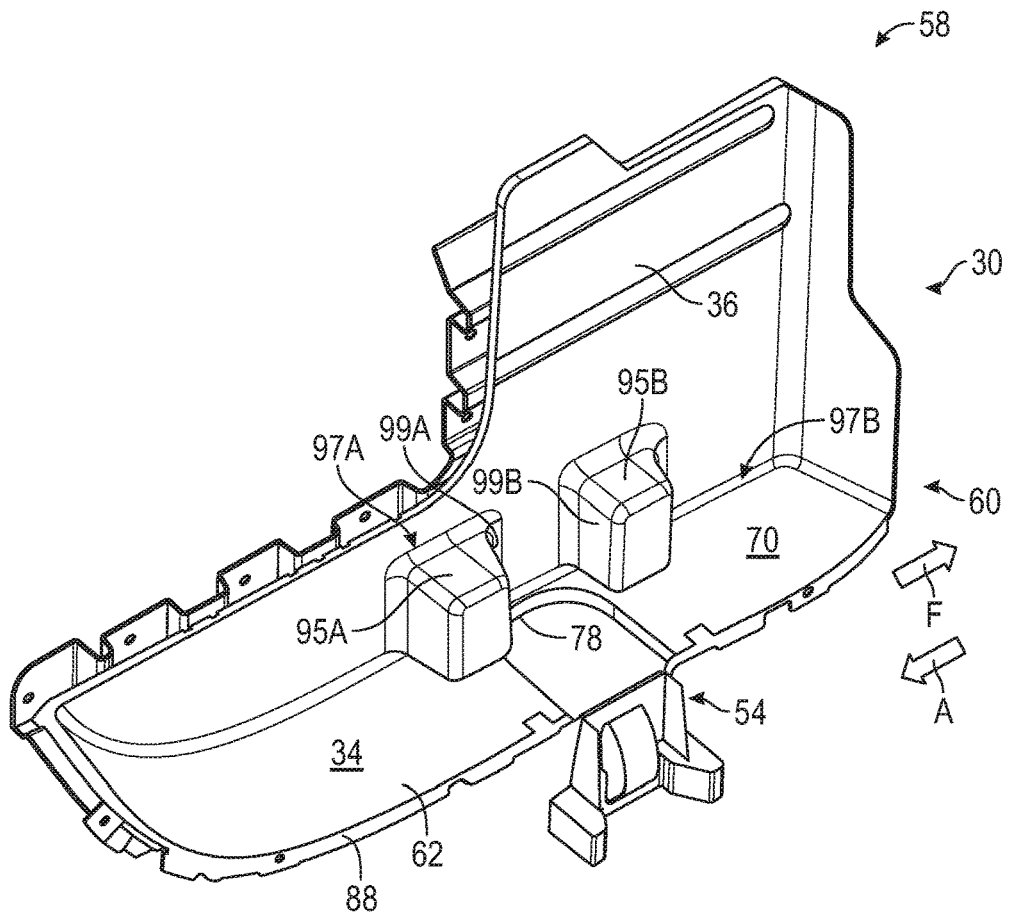
FIG. 4 is a perspective view of another door panel according to an exemplary embodiment.
Figure 5:
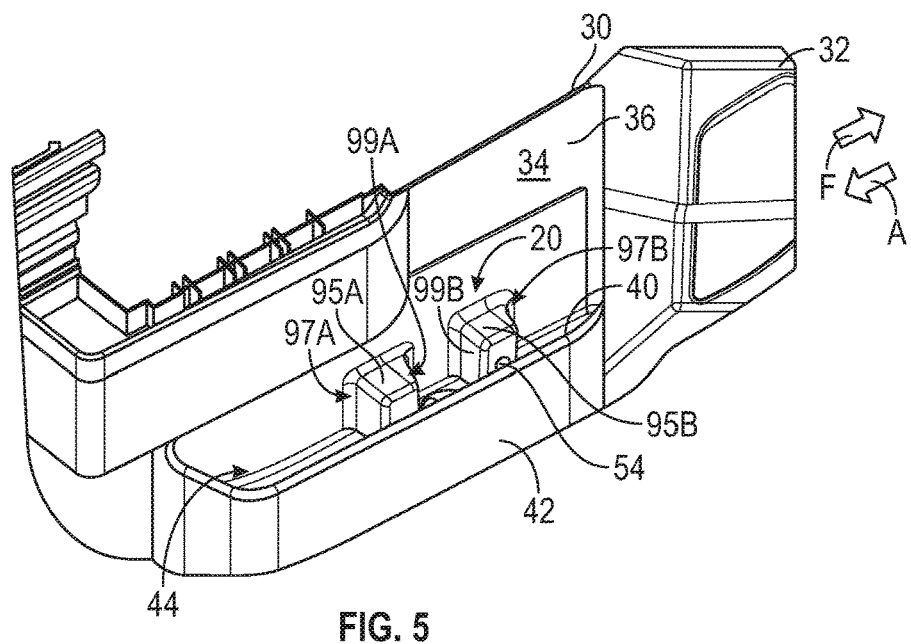
FIG. 5 is an illustration of a door trim panel mounted to the door panel shown in FIG. 4 according to an exemplary embodiment.

The passenger door 10 includes a door panel 30 (illustrated separately in FIG. 4) and a door trim panel 32 (seen in FIG. 5). Referring generally to FIGS. 1, 4, and 5, the door trim panel 32 is mounted to the door panel 30, and the map pocket 20 is defined by both the door panel 30 and the door trim panel 32. Specifically, the door panel includes a main body 34. The main body 34 defines an inner surface 36 that faces a passenger compartment 38 (FIG. 1) of the vehicle (not illustrated). As seen in FIG. 5, the door trim panel 32 defines an inside surface 40 and an outside surface 42. The inner surface 36 of the door panel 30 and the inside surface 40 of the door trim panel 32 cooperate together to define a volume that is the map pocket 20. That is, the inner surface 36 of the door panel 30 defines a portion of the map pocket 20, and the inside surface 40 of the door trim panel 32 defines a remaining portion of the map pocket 20.

FIG. 2A illustrates a side cross-sectioned view of the container holder 22 and the container 24 and FIG. 2B is a top view of the container holder 22 and the container 24. Referring to FIGS. 1, 2A, 2B, and 4, the container holder 22 is defined by a retention wall 50. The retention wall 50 includes a retention member 52 configured to elastically deform when a container is placed within the container holder 22. As explained below, the retention member 52 is an adjustable member for securing containers of different sizes in place within the container holder 22. The retention wall 50 is part of the door panel 30. More specifically, the retention wall 50 and the door panel 30 are molded together during manufacture. In other words, the door panel 30 and the retention wall 50 share the same mold for injection molding.

Referring specifically to FIG. 4, the main body 34 of the door panel 30 includes the inner surface 40, an upper end portion 58, a lower end portion 60, and a shelf 62 located at the lower end portion 60 of the main body 34. The upper end portion 58 of the door panel 30 is oriented towards a roof of the vehicle (not shown), while the lower end portion 60 is oriented towards the wheels of the vehicle (not shown). Referring to FIGS. 1, 3A and 4, the shelf 62 projects outward towards the passenger compartment 38 (FIG. 1) of the vehicle and defines a portion of the map pocket 20. The shelf 62 defines a substantially vertical support surface 70. The container 24 rests upon the vertical support surface 70.

Referring to FIGS. 1 and 4, the vertical support surface 70 defines a cavity 78 shaped to contain a bottommost portion 86 of the container 24. For example, in the embodiment as shown in FIGS. 1 and 4, the cavity 78 includes a substantially arcuate profile that corresponds to the cylindrical shape of the bottommost portion 86 of the container 24. The cavity 78 provides additional stability for the container 24 as the vehicle (not illustrated) operates (i.e., as the vehicle is being driven) as well as when the passenger door 10 is opened and closed. In addition to the cavity 78, FIGS. 4 and 5 illustrate a pair of support walls 95A, 95B defines by the vertical support surface 70 that are aligned with a fore direction F and an aft direction A of the vehicle. Specifically, of the support walls 95A is located on one side 97A of the container holder 22 corresponding to the fore direction F of the vehicle and the remaining support wall 95B is located on an opposing side 97B of the container holder 22 corresponding to the aft direction A of the vehicle.

In one embodiment, the support walls 95A, 95B may be shaped to correspond with the outermost profile 26 (FIG. 1) of the container 24. For example, referring to FIGS. 1, 4 and 5, in an embodiment the support walls 95A, 95B each define an arcuate profile 99A, 99B that correspond to a portion of cylindrical outermost profile 26 of the container 24. The support walls 95A, 95B may provide additional support to the container 24. Specifically, when the vehicle is operating, the support walls 95A, 95B may provide a barrier that prevents the container 24 from tipping over if the vehicle comes to a sudden stop. The support walls 95A, 95B may also provide a barrier that prevents the container 24 from tipping over when the passenger door 10 is swung open or shut very forcefully. In addition to the support walls 95A, 95B, the inner surface 40 of the door panel 30 may also provide additional support to the container 24 as well.

The retention wall 50 extends from the shelf 62 of the main body 34 of the door panel 30, where the retention wall 50 and a portion of the inner surface 36 of the main body 34 of the door panel 30 define the container holder 22. Referring to FIGS. 3A, 3C, and 4, the retention wall 50 is connected to the door panel 30 by a living hinge 54. The living hinge 54 extends along a lowermost edge 88 of the shelf 62 of the door panel 30. The living hinge 54 is a thinned section of the plastic material 56 connecting the door panel 30 to the retention wall 50. The thinned section of the plastic material 56 of the living hinge 54 represents an area of the door panel 30 having a reduced cross-sectional thickness.

In one embodiment, the door panel 30, the retention wall 50, the retention member 52, and the living hinge 54 are constructed of either polypropylene or thermoplastic olefin (TPO). These materials are selected based on their relatively high flexibility. However, it is to be appreciated that the door panel 30, the retention wall 50, and the living hinge 54 may be constructed of any thermoplastic used in injection molding processes. In the embodiment as shown in the figures, the living hinge 54 is a flat-type living hinge having a single thinned section of plastic material 56. However, it is to be appreciated that the figures are merely exemplary in nature, and the living hinge may include other configurations as well.

Figure 6:
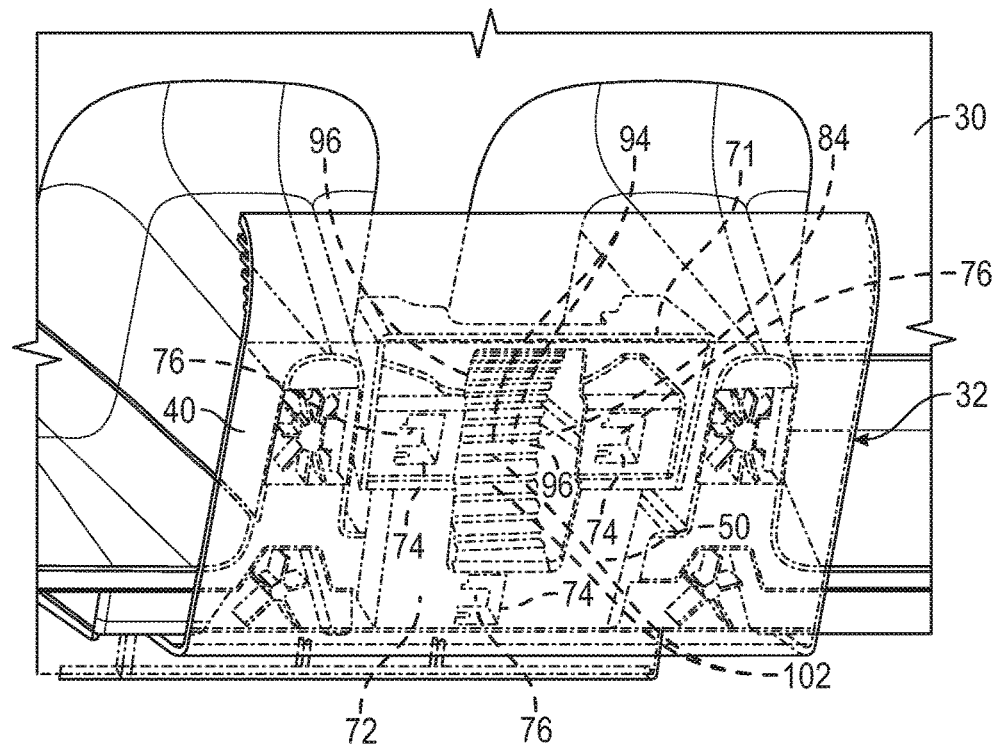
FIG. 6 illustrates the door trim panel in phantom line mounted to the door panel using a snap-fit engagement according to an exemplary embodiment.

During an assembly process, the retention wall 50 may rotate about the living hinge 54 from a first position (seen in FIG. 3A) in a counterclockwise direction towards the inner surface 36 of the door panel 30 (seen in FIG. 3B) and into a second, assembled position (seen in FIG. 1). The retention wall 50 is secured in place in the assembled position by the inside surface 40 of the door trim panel 32 and is unable to rotate about the living hinge 54 back into the first position. Referring now to FIG. 6, in one non-limiting embodiment the retention wall 50 is secured to the inside surface 40 of the door trim panel 32 by a snap-fit engagement. Specifically, the retention wall 50 includes an innermost surface 71 and an outermost surface 72. The outermost surface 72 of the retention wall 50 faces the passenger compartment 38 of the vehicle and defines a plurality of snap-fit features 74 configured to engage with corresponding snap-fit features 76 located inside surface 40 of the door trim panel 32. Although FIG. 6 illustrates a snap-fit engagement, other fastening techniques such as, for example, adhesives may be used to secure the retention wall 50 to the inside surface 40 of the door trim panel 32.

Referring to FIG. 4, the door panel 30 and the retention wall 50 are a single, unitary part. The retention wall 50 and the door panel 30 are molded together during manufacture, and the living hinge 54 connects the retention wall 50 and the door panel 30 to one another. It is to be appreciated that the living hinge 54 allows for the door panel 30 and the retention wall 50 to be part of the same cavity within a mold (not shown). Without the living hinge 54, the door panel 30 and the retention wall 50 would be molded as separate parts. It should also be appreciated that the reduced cross-sectional thickness of the thinned section of plastic material 56 is thin enough to allow for the living hinge 54 to rotate relative to the door panel 30, but at the same time is of a sufficient thickness to allow for molten plastic to flow to the retention wall 50 during an injection molding process.

Figure 3B:
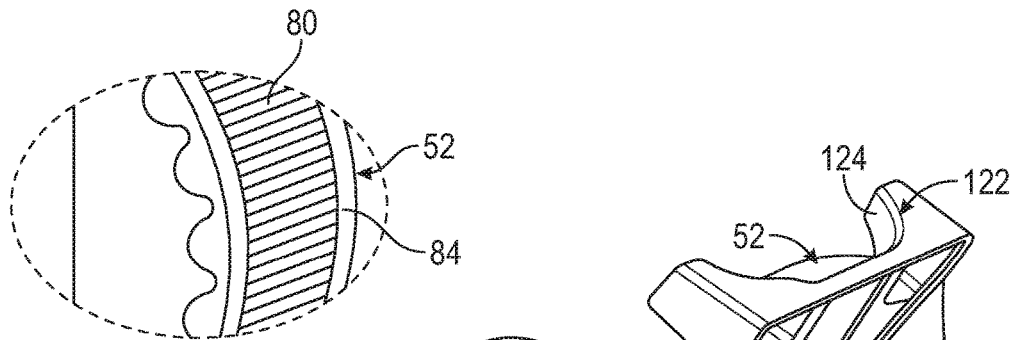
FIG. 3B is an enlarged view of a retaining mechanism of the container holder shown in FIG. 3A according to an exemplary embodiment.
Figure 3C:
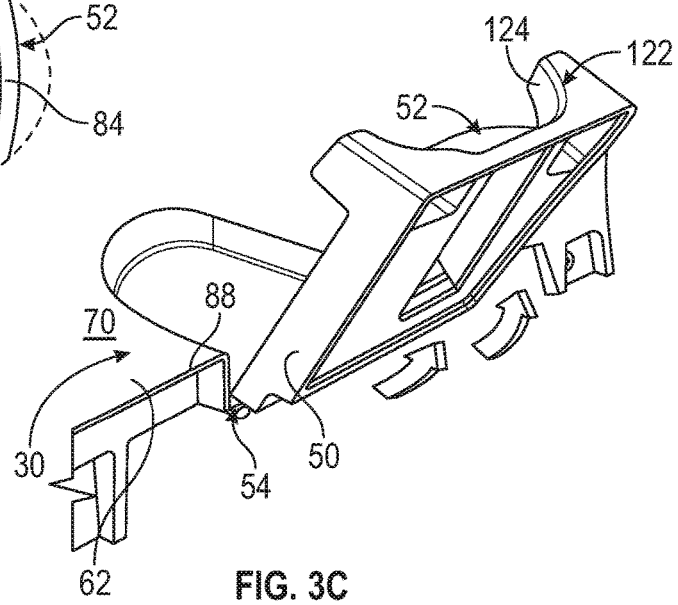
FIG. 3C is an illustration of the container holder being rotated about a living hinge according to an exemplary embodiment.

Referring to FIGS. 1, 3A, and 3B, the retention member 52 of the retention wall 50 is configured to elastically deform and engage with the container 24, thereby holding the container 24 in place within the container holder 22. The retention member 52 is configured to accommodate containers of various sizes. In other words, the retention member 52 may elastically deform and engage with containers of various sizes and profiles. The retention member 52 defines an elongated body 80 having two end portions 82 and a bowed section 84 that extends lengthwise along the retention member 52. The bowed section 84 of the retention member 52 is located between the two end portions 82. As seen in FIG. 3A, the two end portions 82 of the retention member 52 are connected to the retention wall 50. The bowed section 84 of the retention member 52 is flexed towards the inner surface of the main body 34 of the door panel 30 and is configured to elastically deform when the container 24 (FIG. 1) is placed within the container holder 22.

Figure 7:
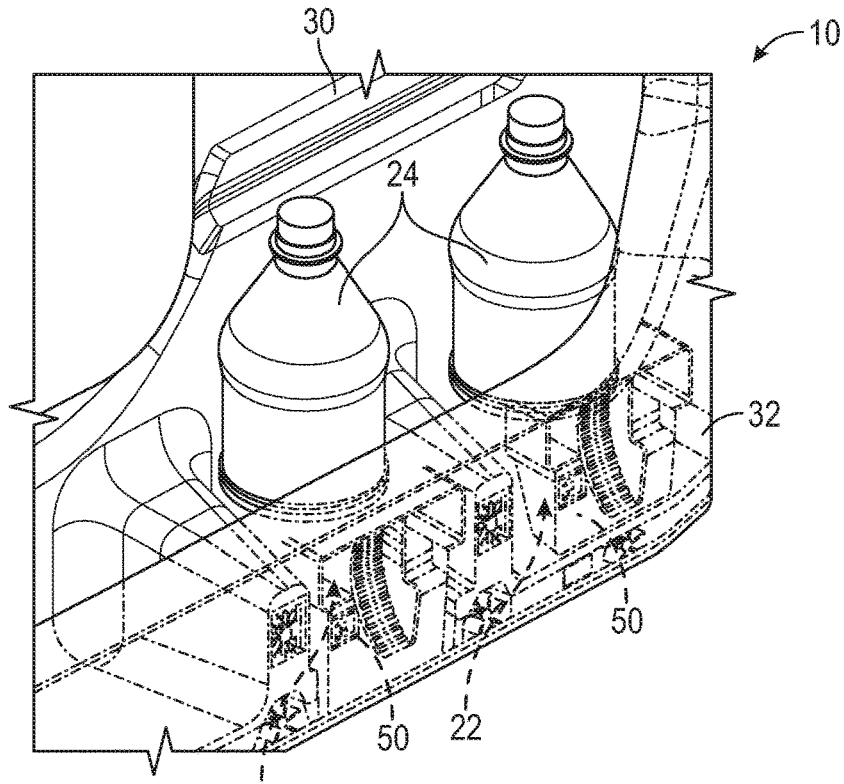
FIG. 7 is an illustration of a passenger door having two container holders according to an exemplary embodiment.

Although FIGS. 1-6 illustrate the passenger door 10 having a single container holder 22 it is to be appreciated that the passenger door 10 may include more than one container holder 22 as well. For example, in the embodiment as shown in FIG. 7, the map pocket 20 includes two container holders 20. Referring back to FIG. 1, in one embodiment the map pocket 20 may also include additional storage space 44 for storing other objects in addition to the container 24.

Figure 8A:
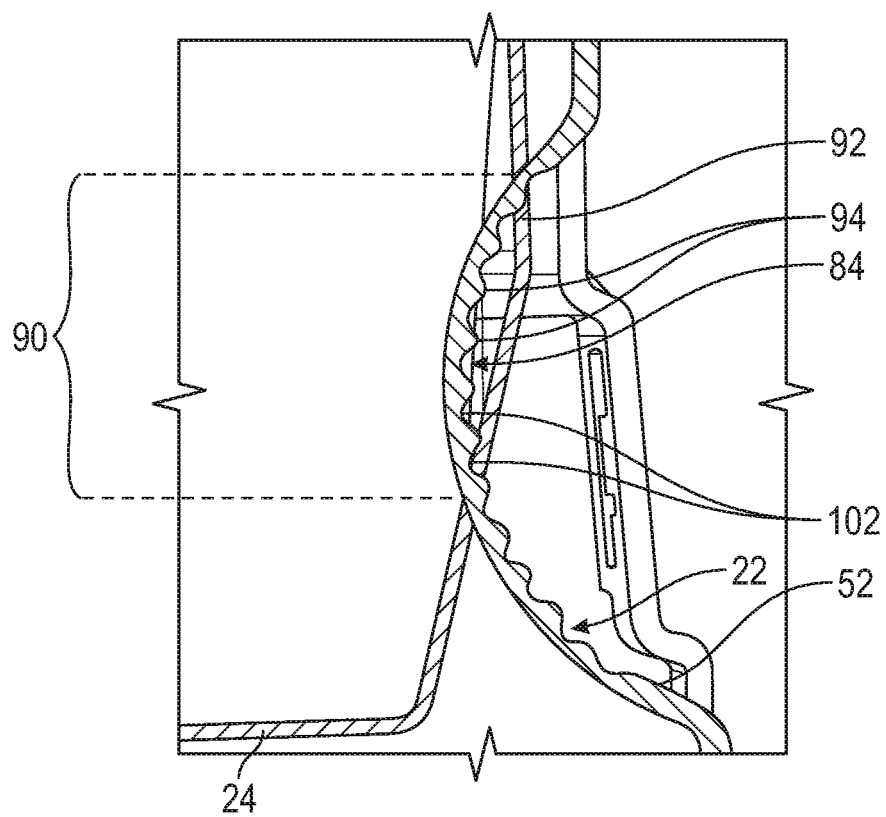
FIG. 8A is an enlarged cross-sectioned view of a portion of the retaining member in interference with the container according to an exemplary embodiment.
Figure 8B:
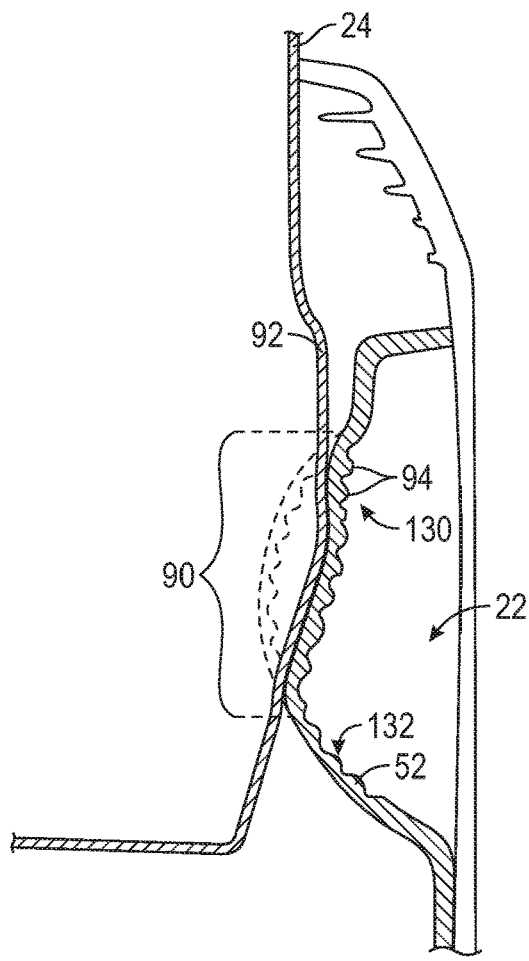
FIG. 8B is an illustration of the retaining member in FIG. 8A being deformed to accommodate the container.

FIG. 8A is an enlarged cross-sectional view of an interference fit between the container 24 and the retention member 52, where a portion 90 of the retention member 52 is shown interfering with a wall 92 of the container 24. Specifically, the portion 90 represents a section of the bowed section 84 of the retention member 52. The interference between the wall 92 of the container 24 and the portion 90 of the retention member 52 represents the amount of elastic deformation required for the retention member 52 to abut against and secure the container 24 in place within the container holder 22. Turning now to FIG. 8B, the portion 90 of the retention member 52 is now shown as elastically deformed to abut against and secure the container 24 in place within the container holder 22.

Referring to both FIGS. 8A and 8B, when the bowed section 84 of the retention member 52 is elastically deformed, the bowed section 84 flexes to accommodate the container 24. The bowed section 84 also abuts against and exerts a force upon the container 24 sufficient to retain the container 24 within the container holder 22. More specifically, the force exerted upon the container 24 by the retention member 52 is sufficient to substantially prevent the container 24 from tipping over and shaking within the container holder 22 during operation of the vehicle (i.e., when the vehicle is driven). Furthermore, it is also appreciated that the force exerted upon the container 24 is sufficient to substantially prevent the container 24 from spilling over or shaking as the passenger door 10 is opened and closed.

It is to be appreciated that if the container 24 shown in FIGS. 8A and 8B was replaced with new container of a different size, the retention member 52 is configured to elastically deform based on the shape and size of the new container. For example, if the new container was smaller in size than the container 24 shown in FIGS. 8A and 8B, then the retention member 52 would undergo less elastic deformation in order to abut against and exert a force sufficient to retain the new container in place within the container holder 22.

The retention member 52 only undergoes elastic deformation to accommodate a container. In other words, the retention member 52 does not experience substantial plastic deformation to accommodate a container. Therefore, once the container 24 is removed from the container holder 22, the retention member 52 is no longer elastically deformed. The retention member 52 springs back, and the bowed section 84 returns to the normal, undeformed configuration seen in FIG. 1.

Referring to FIGS. 6, 8A, and 8B, the retention member 52 defines a series of ridges or undulations 94. The series of undulations 94 extend in a substantially horizontal direction between opposing sides 96 of the elongated body 80 of the retention member 52. In other words, the series of undulations 94 extend in a direction substantially perpendicular with respect to the bowed section 84 that extends lengthwise along the retention member 52. Furthermore, an area of reduced wall thickness 102 is located between two respective undulations 94. The areas of reduced wall thickness 102 increase the flexibility of the retention member 52.

Figure 9:
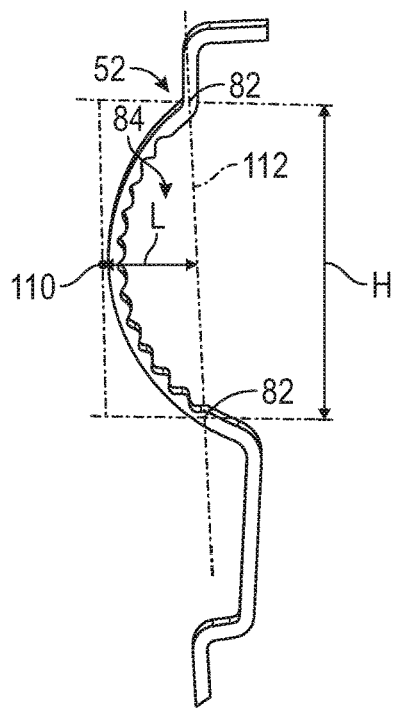
FIG. 9 is a cross-sectioned view of the retaining member according to an exemplary embodiment.

The elastic limit of the retention member 52 represents the amount of elastic deformation that the retention member 52 is configured to undergo in order to accommodate a container placed within the container holder 22. Once the retention member 52 exceeds the elastic limit, the retention member 52 is plastically deformed. FIG. 9 illustrates two dimensions of the retention member 52, namely a length L and a height H of the retention member 52. The length L of the retention member 52 represents a vertical distance between the two end portions 82 of the retention member 52. The height H represents a horizontal distance measured between an apex 110 of the bowed section 84 of the retention member 52 and a vertical line 112. The vertical line 112 extends between the two end portions 82 of the retention member 52.

Figure 8C:
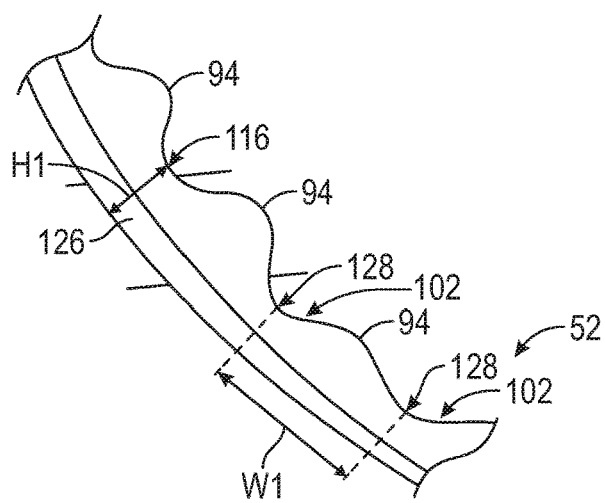
FIG. 8C is an enlarged view of a portion of the retaining member shown in FIGS. 8A and 8B.

The elastic limit of the retention member 52 depends upon the specific shape and configurations of the undulations 94, the material that the retention member is constructed of, and the length L of the retention member 42. Referring now to FIG. 8C, an enlarged view of several undulations 94 shown in FIGS. 8A and 8B is illustrated. Each undulation 94 includes a height H1 and a width W1. The height H1 of an individual undulation 94 represents a distance between a peak point 116 of the undulation 94 and an inner surface 126 of the retention member 52. The width W1 of an individual undulation 94 is the distance measured from one trough 128 to an adjacent trough 128, where the troughs 128 are located in the area of reduced wall thickness 102. More specifically, the troughs 128 each represent a point of minimum height along the undulations 94, while the peak points 116 represent a point of maximum height along the undulations 94.

The elastic limit 52 of the retention member 52 depends upon both the height H1 and the width W1 of the undulations 94. Specifically, the elastic limit of the retention member 52 increases (becomes more flexible without permanent deformation) as the height H1 of the undulations 94 decreases. The elastic limit also increases when the width W1 of the undulations 94 decrease. This is because as the width W1 is reduced, more undulations 94 may be placed along the retention member 52. More undulations 94 result in increased flexibility, while fewer undulations 94 result in decreased flexibility. In addition to the height H1 and the width W1 of the undulations 94, the elastic limit of the retaining member also depends upon the length L of the retaining member 52. More specifically, the retaining member 52 behaves in a similar manner as a beam that is simply supported at both ends and includes a point load in the center that is exerted upon the beam. The maximum deflection that a beam that is simply supported on both ends is dependent upon the length of the beam as well as the amount of force that is being exerted by the point load. More specifically, the greater the point load or the length of the beam, the greater the maximum deflection.

Referring now to both FIGS. 8B and 8C, although the figures illustrate undulations 94 that is substantially uniform with respect to their height H1 and width W1, it is to be appreciated that in another embodiment the undulations may include different heights H1 and widths W1. For example, the undulations 94 along an upper portion 130 of the retaining member 52 may be dimensioned so as to provide more flexibility when compared to the undulations 94 located along a lower portion 132 of the flexible member 52. Specifically, in the present example the undulations located at the upper portion 130 include a smaller width W1 when compared to the undulations 94 located at the lower portion 132 of the retaining member 52. Since the upper portion 130 of the retention member 52 is more flexible when compared to the lower portion 132 of the retaining member 52, a passenger in the vehicle may insert a container into the container holder 22 (FIG. 1) with reduced effort when compared to the effort required to remove the container from the container holder 22. In other words, an individual may be able to insert a container into the container holder 22 with relative ease, however, the flexible member 52 still includes sufficient stiffness in order to keep the container upright within the container holder 22 when the vehicle is driven or when the passenger door 10 (FIG. 1) is opened and closed.

Referring now to FIGS. 1, 3A, and 3C, in addition to the retention member 52 the retention wall 50 may also include other features for securing the container 24 within the container holder 22. For example, in the embodiment as shown the retention wall 50 defines a surface 120 (FIG. 3A) that faces the inner surface 36 of the door panel 30. A molding 122 extends outward from the surface 120 of the retention wall 50 in a direction towards the inner surface 36 of the door panel 30. The molding 122 includes a retention surface 124 that is shaped to correspond with the outermost profile 26 of the container 24. In the exemplary embodiment as shown, the molding 122 of the retention wall 50 includes a substantially arcuate profile that corresponds to the substantially cylindrical outermost profile 26 of the container 24. The molding 122 of the retention wall 50 provides further support to the container 24.

Figure 10:
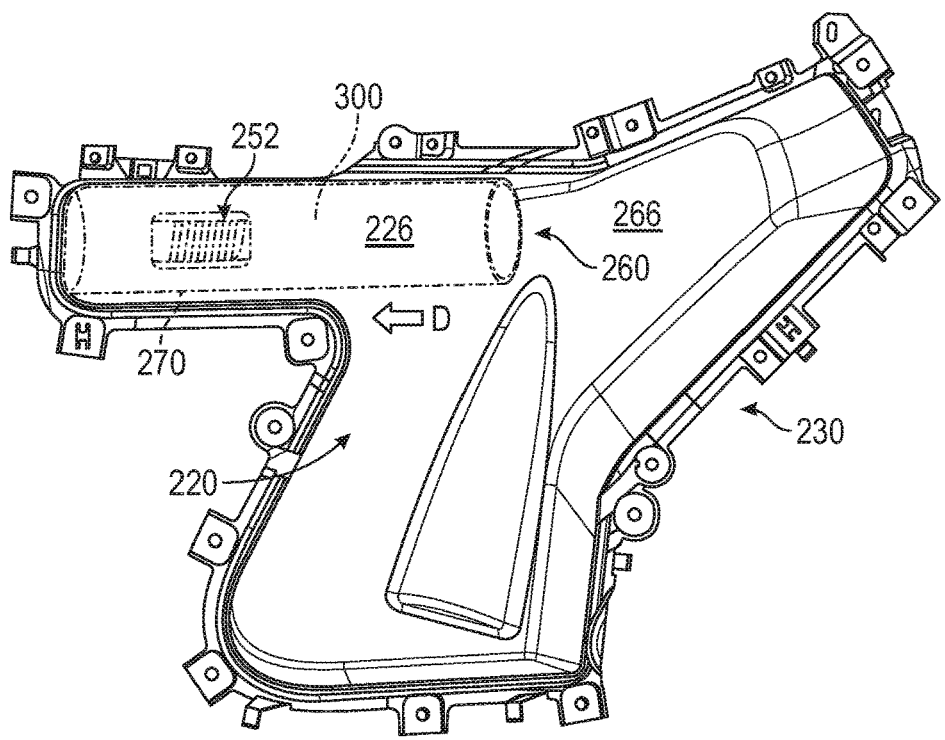
FIG. 10 is an alternative embodiment of the door panel shown in FIGS. 1-9, where the map pocket secures an object other than a container according to an exemplary embodiment.

Although the container 24 is described, it is to be appreciated that other objects may also be placed in the map pocket 20 as well. For example, FIG. 10 illustrates an alternative door panel 230 having a map pocket 220. The map pocket 220 defines a cavity 260 that is shaped to accommodate an object 300 other than the container 24 shown in FIGS. 1-9. In the embodiment as shown, the object 300 defines substantially cylindrical outermost profile 226, and the cavity 260 includes a substantially cylindrical profile 270 corresponding to the outermost profile 226 of the object 300. In one exemplary embodiment, the object 300 is is a compact or pocket umbrella. However, it is to be appreciated that the map pocket 220 is not limited to retaining only objects having cylindrical profiles.

A retention member 252 is disposed along a wall 266 of the cavity 260. The retention member 252 includes a structure similar to the retention member 52 shown in FIG. 1-9, however the retention member 252 is not part of a retention wall. Instead, the retention member 252 is part of or is integral with the wall 266 of the door panel 230. The object 300 may be slid in a direction D and is inserted into the cavity 260 of the map pocket 220. The retention member 252 is aligned with the direction D, and is configured to elastically deform as the object 300 is inserted into the cavity 260 of the map pocket 220. Once the object 300 is fully inserted into the map pocket 220, the retention member 252 engages with and secures the object 300 in place.

Referring generally to the figures, technical effects and benefits of the disclosure include a container holder that is configured to secure objects of varying size. More specifically, in an embodiment the container holder includes a retention member that is configured to engage and secure containers of different sizes within the map pocket of a door. The container holder may be molded as part of the door trim. In other words, the container holder may be manufactured without the need for a separate mold. Thus, the container holder requires minimum investment to add. The retention member of the container holder may secure a beverage container in place to substantially prevent the beverage container from falling over and spilling fluid into the map pocket. The beverage container may also be unable to substantially vibrate within the container holder during operation of the vehicle, which in turn reduces or eliminates rattling and other noise concerns.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A door panel for a passenger door of a vehicle, wherein the door panel includes a map pocket having a container holder, the door panel comprising:
   a main body defining an inner surface facing a passenger compartment of the vehicle, a lower end portion, and a shelf located at the lower end portion of the main body, wherein the shelf extends from the inner surface of the main body and towards the passenger compartment of the vehicle to define a portion of the map pocket;
   a retention wall extending from the shelf of the main body, wherein the retention wall and a portion of the inner surface of the main body define the container holder; and
   a retention member defining an elongated body having two end portions and a bowed section located between the two end portions, wherein the two end portions of the retention member are connected to the retention wall and the bowed section flexes towards the inner surface of the main body, and wherein the retention member is configured to elastically deform when a container is placed within the container holder.

2. The door panel of claim 1, further comprising a living hinge connecting the retention wall to the main body.

3. The door panel of claim 2, wherein the living hinge extends along a lowermost edge of the shelf of the door panel.

4. The door panel of claim 1, wherein the retention member defines a series of undulations extending in a direction substantially perpendicular with respect to the bowed section of the retention member.

5. The door panel of claim 4, wherein the retention member includes an area of reduced wall thickness located between two respective undulations.

6. The door panel of claim 4, wherein an elastic limit of the retention member is based on a height and a width of each undulation.

7. The door panel of claim 1, wherein the retention member is constructed of either polypropylene or thermoplastic olefin (TPO).

8. The door panel of claim 1, wherein the retention wall defines an innermost surface that opposes the inner surface of the main body of the door panel and an outermost surface that faces the passenger compartment of the vehicle.

9. The door panel of claim 8, further comprising a door trim panel mounted to the door panel, wherein an inside surface of the door trim panel defines a remaining portion of the map pocket.

10. The door panel of claim 8, wherein an outermost surface of the retention wall defines a plurality of snap-fit features configured to engage with corresponding snap-fit features located along an inside surface of the door trim panel.

11. The door panel of claim 1, wherein the retention wall defines a surface facing the inner surface of the door panel, and wherein a molding extends outward from the surface of the retention wall in a direction towards the inner surface of the door panel.

12. The door panel of claim 11, wherein the molding includes a retention surface shaped to correspond with an outermost profile of the container.

13. The door panel of claim 1, wherein the shelf defines a support surface, and wherein the container rests upon the support surface.

14. The door panel of claim 13, further comprising a pair of support walls defined by the vertical support surface, wherein the pair of support walls are aligned with a fore direction and an aft direction of the vehicle.

15. The door panel of claim 14, wherein one of the pair of support walls is located on one side of the container holder corresponding to the fore direction of the vehicle and a remaining support wall is located on an opposing side of the container holder corresponding to the aft direction of the vehicle.

16. A passenger door of a vehicle, comprising:
- a door panel a door panel including a map pocket having a container holder and a main body, wherein the main body defines an inner surface facing a passenger compartment of the vehicle, a lower end portion, and a shelf located at the lower end portion of the main body, wherein the shelf extends from the inner surface of the main body and towards the passenger compartment of the vehicle to define a portion of the map pocket;
- a door trim panel mounted to the door panel, wherein the door trim panel defines a remaining portion of the map pocket;
- a retention wall extending from the shelf of the main body, wherein the retention wall and a portion of the inner surface of the main body define the container holder;
- a living hinge connecting the retention wall to the door panel; and
- a retention member defining an elongated body having two end portions and a bowed section located between the two end portions, wherein the two end portions of the retention member are connected to the retention wall and the bowed section flexes towards the inner surface of the main body, and wherein the retention member is configured to elastically deform when a container is placed within the container holder.

17. The passenger door of claim 16, wherein the retention member defines a series of undulations extending in a direction substantially perpendicular with respect to the bowed section of the retention member.

18. The passenger door of claim 17, wherein the retention member includes an area of reduced wall thickness located between two respective undulations.

19. The passenger door of claim 17, wherein an elastic limit of the retention member is based on a height and a width of each undulation.

20. The passenger door of claim 16, wherein the retention wall defines a surface facing the inner surface of the door panel, and wherein a molding extends outward from the surface of the retention wall in a direction towards the inner surface of the door panel.

* * * * *